Jan. 26, 1965 E. J. RACHWAL ETAL 3,167,756

ANALOG TO DIGITAL CONVERSION APPARATUS

Filed Dec. 7, 1959 2 Sheets-Sheet 1

Jan. 26, 1965 E. J. RACHWAL ETAL 3,167,756

ANALOG TO DIGITAL CONVERSION APPARATUS

Filed Dec. 7, 1959

2 Sheets-Sheet 2

3,167,756
ANALOG TO DIGITAL CONVERSION APPARATUS
Ervin J. Rachwal, Holbrook, and Bruce J. Loughlin, South Acton, Mass., assignors to Data Technology, Inc., New York, N.Y., a corporation of New York
Filed Dec. 7, 1959, Ser. No. 857,747
2 Claims. (Cl. 340—347)

This invention relates to analog to digital conversion apparatus and more particularly to an improved converter apparatus utilizing magnetic principles which is especially suitable for the accurate indication of the relative positions of two elements. The apparatus finds a particular use as a shaft position indicator.

Apparatus constructed in accordance with the invention provide, in digital form, an accurate indication of an analog quantity, for example the position of a movable member with reference to a fixed member. It is susceptible to use for linear measurements where great precision is required or to use in conjunction with rotary assemblies where the exact position of a shaft is significant.

The principal types of analog to digital conversion devices involve the quantizing of analogue data and frequently include some means of interpolation between the quantized bits of data. Among the limitations of such devices are the size of the quantized bits of information that are produced and the accuracy with which interpolation can be achieved between those bits. Typical devices heretofore utilized to quantize data incorporate electrical brush-type pick-off or optical pick-off elements. In the latter the bits of information can be more compactly positioned but that type of device is limited by problems associated with the slit width and other optical considerations. Due to these factors the devices utilized heretofore have either had to sacrifice a certain amount of precision or have been large and complex and much too expensive, too delicate and too cumbersome for many, if not most, applications.

Accordingly, an object of this invention is to provide an analog to digital converter apparatus which utilizes magnetic elements and provides digital indication of the data with a high degree of precision.

Another object of the invention is to provide a compact, accurate, magnetic sensing apparatus capable of providing digital signals indicative of an analog value.

Another object of the invention is to provide apparatus suitable for incorporation in a shaft position indicator which provides output signals in digital form directly representative of very minute changes of shaft position.

In apparatus constructed in accordance with the invention there are provided two magnetically related component sets, each of which includes a magnetic track component and an associated reading head component adapted to read indicia recorded on the track. One track has a predetermined multiplicity of indicia equally spaced thereon, which are adapted to be magnetically sensed by the associated reading head, and the other track has at least one more of the same type of indicia also equally spaced thereon, the positions of which are sensed by its associated reading head. One component of each assembly is adapted to be moved with respect to a component of the other assembly and the other two components are adapted to be moved as a unit in a sampling operation. When a point of closest coincidence of indicia on the two tracks is detected a digital signal indicative of the analog quantity being converted is provided. This signal is a precise indication of the relative positions of two associated members.

In one embodiment of the invention the apparatus functions as a shaft position indicator, which is useful for measuring the position of a shaft relative to a fixed reference. For example, a circular magnetic track on which are recorded one thousand bits of equally spaced indicia is arranged to be driven by the rotating shaft. A similar magnetic track of equal length with nine hundred and ninety-nine recorded bits equally spaced thereon is secured to a reference member. Sensing apparatus, in the form of a set of reading heads, one for each track, which is adapted to accurately sense the positions of the bits in each track, is mounted for scanning the tracks. The two reading heads are suitably aligned and the tracks are scanned for the position of coincidence of two bits, one on each track. The position of coincidence (or null) of two indicia travels the complete length of the tracks during only 1/1000 of a full revolution of the shaft in accordance with vernier principles. Thus where the point of coincidence can be determined within one bit, the system provides an output signal indicative of the shaft position to an accuracy of 1/1,000,000 of a full shaft revolution. The present state of the magnetic recording art is such that one thousand suitable indicia may be recorded per inch at the present time and a recording density of two to five thousand indicia per inch may soon be obtainable. Thus the invention provides an exceptionally fine degree of resolution in a very compact analog to digital conversion apparatus. A converter in the form of a shaft position indicator having a structural diameter of 3 inches, for example, enables measurements with an accuracy of .1 second of arc. The output information is immediately available in digital form and no complex mechanical and optical systems for sensing are required.

Other objects and advantages of the invention will be seen as the following description of preferred embodiments thereof progresses in conjunction with the drawings, in which.

Figure 1:
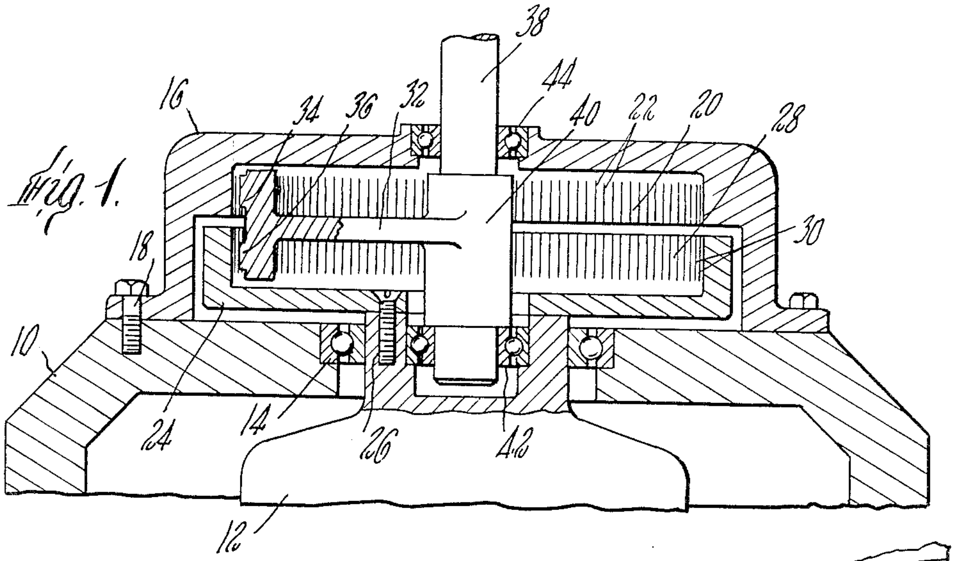
FIG. 1 is a sectional view of a shaft position indicator which incorporates principles of the invention.

The apparatus shown in FIG. 1 is a shaft position indicator suitable for use, for example, with gyroscopic devices. A fixed support frame 10 is provided and a gimbal shaft 12 is mounted therein for rotation relative thereto. Bearings 14 of a suitable nature are provided to support, position and permit the desired relative rotation. The shaft position indicator casing 16 is secured on the support frame 10 by means of bolts 18 and includes a cylindrical magnetic track surface 20 composed of a suitable material such as a layer of ferric oxide formed integrally therewith which has one thousand indicia or bits 22 magnetically recorded thereon. These bits are equally spaced, and in this embodiment are recorded in the form of a sine wave. The position of each peak of the sine wave is indicated by a vertical line on the tracks shown in FIG. 3. A second magnetic track carrying member 24 is attached to the gimbal shaft 12 by means of screws 26. A second cylindrical magnetic track surface 28 equal in length to track 20 is formed integrally with member 24 and is positioned in alignment with track 20. The track surface 28 has one thousand and one equally spaced bits 30 recorded thereon.

While the indicia may be recorded in other forms where compactness is desired the recorded indicia tend to approach sinusoidal form due to the fringing effects of the recorded magnetic fields and therefore it is often desirable to select this form in the first instance.

The number of indicia recorded on the track having the greater number of indicia should bear a relationship to the units in which the measurement is being made. An incremental cycle will be defined as equal to the spacing between the indicia on that track and a complete cycle of the null occurs with a relative movement of the two scales of that amount. The number of indicia on the fixed track can be either greater or smaller than the number of indicia on the movable track. It may be advantageous in some cases to arrange the tracks so that the fixed track has the fewer indicia as the null travels in the same direction as the movement of the null sensing device in that case.

It is essential that the indicia be placed on the tracks with a high degree of precision. A suitable technique for recording the indicia is to initially write the requisite number of indicia on the track in the form of a continuous sine wave having the requisite number of peaks. This may be accomplished, for example, by using a synchronous motor driven at the writing frequency which drives the magnetic track structure through a precision gear train. An averaging technique is then employed in which the recorded indicia are read from N different points, the signals are averaged and the resultant signal is then utilized to rewrite the indicia on the track. This technique results in the positional error being reduced by a factor of N. The sampling points (at which the N reading heads are positioned) should be positioned as accurately as possible to read the same phase relationship in the recorded sine wave. Conventional oscilloscope comparison techniques may be utilized in the adjustment of the positions of these reading heads by employing the output signals produced as the read heads sense the recorded sine wave and adjusting their position so there is minimum phase difference between two sensed signals. After the heads are satisfactorily positioned the track is simultaneously scanned by all the heads, the output signals are averaged and the single resultant signal is used to rewrite the track with increased accuracy. As the spacing of the sine wave improves, the sampling points can be more accurately positioned. Only a few rewrites are necessary to achieve the desired accuracy of the magnetic track. This accuracy is presently limited somewhat by the noise factor of the available magnetic materials and should increase as improved materials are developed. The associated track (containing one more or one less indicium for example) may be initially written by feeding the signal from the written track through a shaft mounted resolver.

A reading head structure 32 is provided to scan the tracks, while the reading head structure is illustrated as being disposed inside of the magnetic tracks 20, 28 for reading an interior cylindrical surface, it will be understood that, if desired, the reading heads might be positioned to the outside of tracks written on outer cylindrical surfaces. Two reading heads 34, 36 are provided, one associated with each track.

A variety of suitable reading heads are available. Among the factors involved in the selection of a suitable head is the requirement that the cut-off frequency of the head must be above the reading frequency. A single head may be utilized per track or a plurality of heads may be utilized. Where heads are positioned on opposite sides of the structure compensation for shaft runout is provided. An additional advantage in a plurality of heads is in the enabling of the averaging principle to be applied in null detection operations.

Shaft 38 is adapted to drive the reading head structure in rotation. The shaft 38 is supported by a first bearing assembly 42 mounted on the gimbal shaft 12 and a second supporting bearing assembly 44 is mounted in the casing 16 of the indicating apparatus. A counting track on the same member as track 28 and associated read head may be utilized to provide an indication of the gross rotation of the shaft 12 and the position of the null. An arm 32 extending from the bushing 40 carries the two aligned reading heads 34, 36 and the electrical signals produced as a result of their sensing the individual bit locations on the tracks are transferred to appropriate conductor means (not shown) through the shaft and are taken off by a conventional commutator arrangement for use in the associated null detection equipment.

Figures 2, 3:
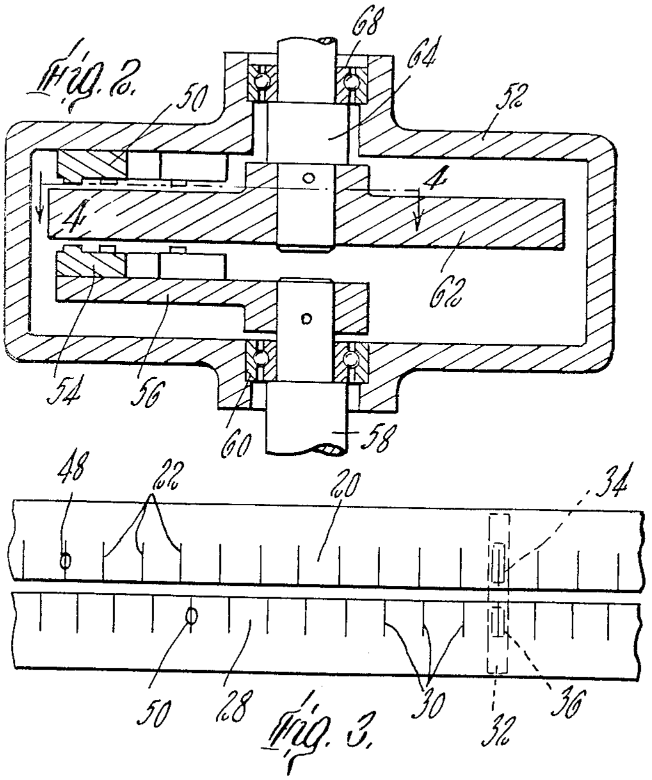
FIG. 2 is a sectional view of a second embodiment of the invention, also a shaft position indicator.
FIG. 3 is a diagrammatic view of the magnetic tracks utilized in the shaft position indicator embodiment shown in FIG. 1.

A unique signal manifestation 48 (zero) is recorded at one point on track 20 to establish a point of reference for each measurement and a similar indicium 50 may be recorded on track 28 so that the gross relative rotation of the gimbal shaft relative to the support structure may be determined. The two tracks are diagrammatically illustrated in FIG. 3 with the reading head structure 32 being positioned directly over the exact point of coincidence of two bits. Thus the mark 50 is shown in FIG. 3 as being offset three bits from mark 48; this indicates a gross rotation of the gimbal shaft 12 of $3/1000$ of a complete revolution. The precise point of coincidence is shown as occurring eleven bits from mark 48 (measured along track 20) and therefore the exact amount of shaft revolution would be .003011 of a complete revolution.

A second embodiment of a shaft position indicator is shown in FIG. 2. In this embodiment one set of reading heads 50 is mounted on the casing 52 and a second set 54 is mounted on an arm 56 which is secured to the movable shaft 58 whose position is to be sensed. The shaft is suitably supported for rotation by a conventional bearing assembly 60. The two sets of heads thus are movable relative to one another. The magnetic tracks which are sensed by the sets of reading heads are recorded on a single disc member 62 which is secured to a drive shaft 64 that is supported in the casing 52 by bearing assembly 66 so that it may be rotated. The disc may be a carrier member coated with suitable magnetic material or it may be a magnetizable disc, for example. This device is designed to provide a direct digital indication of the shaft position in degrees, minutes and seconds. Three pairs of magnetic tracks 68, 70, 72 are recorded on the movable disc 62 and a reading head unit is associated with each track.

Figure 4:
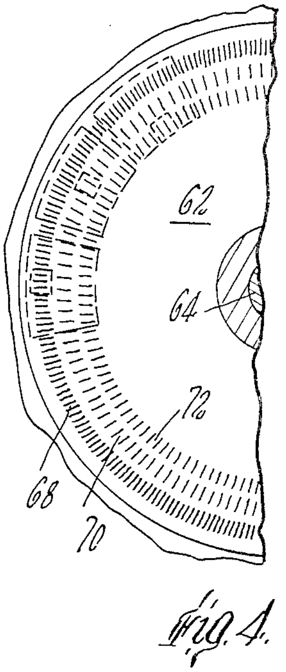
FIG. 4 is a sectional view along the line 4—4 of FIG. 2 illustrating the magnetic disc element of that indication on which three sets of magnetic tracks are recorded.

As indicated diagrammatically in FIG. 4, three tracks, indicated as 68, 70, 72, containing magnetically recorded indicia, are positioned on the upper surface of disc 62. Corresponding tracks are positioned on the lower surface of the disc. The outer pair of tracks 68 is utilized for indicating shaft rotation in seconds. The stator track of this pair (the track associated with the fixed reading head structure on the upper surface of the disc), has 3599 bits of magnetic information recorded thereon and, the rotor track, has 3600 bits recorded thereon. The middle pair of tracks 70 is used to indicate minutes. The stator track of this pair has 359 bits of magnetically recorded on its tracks and 360 bits are recorded on the corresponding rotor track. The third pair of tracks 72 is utilized to indicate degrees, 3600 bits being recorded on the stator track and one bit on the rotor track. Three reading heads are positioned in each unit and as shown in FIGS. 3 and 4 they are offset from one another to provide better utilization of the available space. The corresponding pairs of heads, however, are mounted so that they may be exactly aligned and so that all three pairs of heads may be in alignment simultaneously.

In digital representation there is always an ambiguity in the least significant digit. Therefore if the total range of numbers to be represented is too great to be handled in one incremental cycle, an additional incremental cycle of a coarser range must be employed, and the results of these two ranges put together for a total answer. Since the least significant digit of any incremental cycle may be ambiguous it may not be used if it is not the least significant digit of the total answer. Therefore there must be some overlap in the incremental cycles so that the possible error in the least significant digit of the more significant cycles will not affect the total answer. For example if the total range is 0 to 999999 and one incremental cycle can include only three digits the range would have to be broken up into three degrees of coarseness 000,000 to 999000, 0,000 to 9990 and 00 to 99. Suppose the true number is 348972 the first range would count 348000 or 349000 or 347000, the second range would count 8960, 8970 or 8980 and the third or final range would count 72. Therefore the total answer is $$\begin{array}{r} 349000 \\ 8970 \\ 72x \\ \hline 348972 \end{array}$$

which is the correct number. This fact dictates the selection of 3600 indicia on the degree track, for example.

In the shaft position indicator configuration the outside pair of tracks (used to indicate seconds) has an incremental cycle of $\frac{1}{3600}$ of a revolution of the shaft (i.e. 360 seconds or $\frac{1}{10}$ of a degree). Therefore, movement of the null through one degree (or past ten bits) will correspond to one second of arc. In the sensing operation, disc 62 is rotated from the zero point to the position where the reading heads sense exact coincidence between the indicia then directly under the read heads and the number of bits past which the disc has rotated provides a direct and precise indication of the position of shaft 58 in seconds.

The intermediate pair 70 of magnetic tracks (used to indicate minutes) has an incremental cycle of $\frac{1}{360}$ of a revolution of the shaft (60 minutes). Therefore, six degrees of null movement (or 6 bits) correspond to one minute of shaft rotation. The third pair 72 of tracks is utilized to provide a direct indication of the shaft position in degrees, and is also used to determine the position of nulls.

When the counter bit (the single bit on rotor track 72) passes the associated reading head 54 the signal produced will start the counters. The seconds counter, which is stepped by every tenth bit sensed by the read head associated with rotor track 68, will count to sixty and then reset to zero. The minutes counter, which is stepped by every sixth bit sensed by the read head associated with rotor track 70, will also step to sixty and then be reset to zero, while the degree counter is stepped as a result of every third bit sensed by the read head associated with stator track 72. When the point of coincidence (null) of bits in each set of tracks is established the stepping of the associated counter is stopped. Thus a digital indication of the shaft position in seconds, minutes and degrees is obtained as a result of one revolution at most of disc 62.

Figure 5:
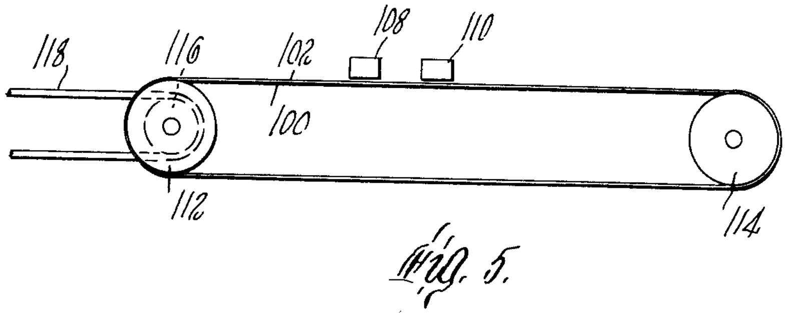
FIG. 5 is a diagrammatic view of a linear measuring device constructed according to principles of the invention.
Figure 6:
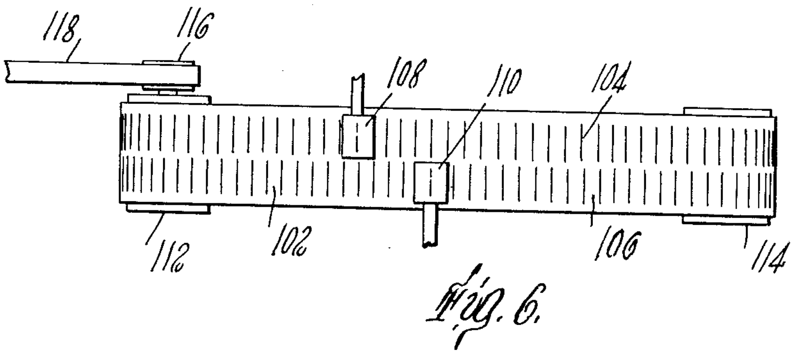
FIG. 6 is a top view of the device shown in FIG. 5.

The principles of the invention are also applicable to linear measuring apparatus and a suitable system is diagrammatically illustrated in FIGS. 5 and 6. A dimensionally accurate nonmagnetic carrier tape 100 such as stainless steel having a suitable magnetic coating 102 such as ferric oxide has two tracks 104, 106 each capable of having bits accurately and evenly spaced magnetically recorded thereon as shown in FIG. 6. A first reading head 108 is associated with the mechanism whose position is to be measured. This might be a lathe tool, for example. The tape 100 is in the form of a continuous loop and is mounted on spaced rollers 112, 114 so that it is under a predetermined and constant tension. Suitable drive means (indicated for illustrative purposes only, as a pulley 116 and a belt 118) periodically or continuously drive the tape as desired. Track 104 has at least one more indicia than track 106 and the reading heads when displaced from one another, sense a coincidence between indicia as the tape is moved past them. The displacement of the tape from a zero reference is a portion of an incremental cycle and hence a fine indication of the spacing of the two heads is provided.

Figure 7:
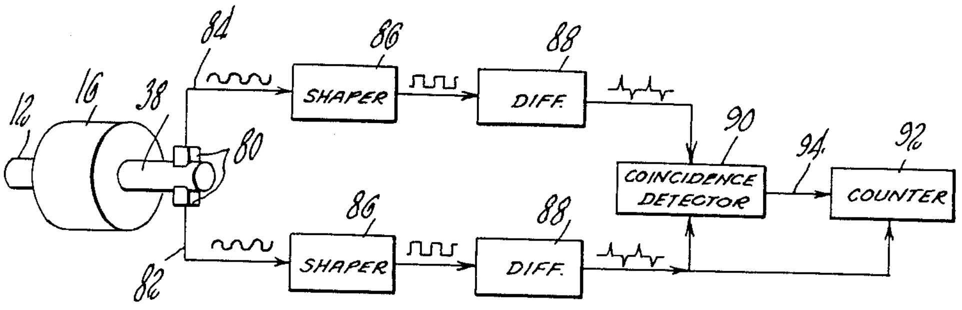
FIG. 7 is a block diagram of suitable circuitry for association with the indicating apparatus to provide an immediate digital indication of precise shaft position.

Various means of null detection may be utilized. For example, a phase sensitive demodulator which has zero output when two signals are 90° out of phase may be employed. Another suitable device is a coincidence detector comprised and AND circuits. A suitable circuit arrangement is indicated in FIG. 7. In that figure there is shown the shaft position indicator casing 16, the input shaft 12 and the output shaft 38 are shown in diagrammatic form. As the reading heads 34, 36 pass over the magnetically recorded indicia on tracks 20 and 28 the change in magnetic flux is sensed by the read heads and signals are generated which are translated through brushes 80 to lines 82 and 84 respectively. Each pulse train is applied through a shaper 86 and a differentiating circuit 88, and the pulse output circuits are applied to a coincidence detector 90. A variety of suitable coincidence detector circuits capable of responding to pulses which occur within less than 100 millimicroseconds of each other are well known. With avalanche diode techniques response to pulse time differences of considerably smaller magnitude is possible. A counter 92, started when the unique value 48 on track 20 is sensed, is stepped by each pulse applied on line 82 until the exact point of coincidence between the two pulse trains is sensed by the coincidence detector 90. At that time the coincidence detector generates an output signal on line 94 which inhibits further stepping of counter 92.

Another suitable type of null detector responds to a signal having a frequency equal to the difference between the frequency of two read head output signals. Such a detector incorporates a mixer circuit which beats the two frequencies produced by the two tracks; a low pass filter which blocks the high frequency components and passes only the difference frequency component; and a trigger circuit activated by a zero crossing of the resultant signal.

Thus the invention provides a compact, sensitive and highly accurate analog to digital converter which finds particularly advantageous use as a shaft position indicator. It will be obvious to those skilled in the art that various other apparatus configurations and types of associated equipment may be utilized than those that have been described in detail. For example, the several tracks might be recorded on the periphery of a disc with reading heads disposed to the outside thereof. Also the form of the recorded indicia may vary commensurate with the size of the apparatus and the accuracy desired. Therefore, while preferred embodiments of the invention have been shown and described, it is appreciated that still additional modifications thereof will be readily apparent to those having ordinary skill in the art and, accordingly, the invention is not intended to be limited to the described embodiments or to details thereof and departures may be made therefrom within the spirit and scope of the invention as defined in the claims.

We claim:

1. Apparatus for providing a digital indication of the angular displacement of a first member with respect to a second member comprising a first magnetic flux sensing head movable in accordance with the movement of said first member, a second magnetic flux sensing head movable in accordance with the movement of said second member, a disc cooperating with said first and second magnetic flux sensing heads for providing digital information on the displacement of said first member relative to said second member, said disc including first and second trains of indicia of equal angular length recorded on opposite radial surfaces thereof, each train of indicia being magnetically recorded thereon in an endless series and including a single index indication, and each said indicium being recorded in the form of a sine wave with the peaks of each sine wave equally spaced in each said series and one series including one more indicium than the number of indicia in the other series, structure enclosing said disc and flux sensing heads and secured to said first member, said first flux sensing head being mounted on said enclosing structure for rotation therewith about a predetermined axis, said second flux sensing head being mounted within said enclosuring structure for rotation independently thereof about said axis and said disc being positioned between said first and second flux sensing heads and mounted for rotation about said axis, drive means for said disc extending from said enclosing structure in one direction along said axis, and drive means for said second flux sensing head extending from said enclosing structure in the opposite direction along said axis.

2. The apparatus as claimed in claim 1 and further including phase discriminating circuitry connected to said flux sensing means for indicating the point at which the two sine waves recorded in said first and second trains of indicia as sensed by said first and second flux sensing means are exactly in phase.

References Cited in the file of this patent

UNITED STATES PATENTS

| | | |
|---|---|---|
| 2,557,219 | Flint | June 19, 1951 |
| 2,734,188 | Jacobs | Feb. 7, 1956 |
| 2,738,461 | Burbeck | Mar. 13, 1956 |
| 2,775,755 | Sink | Dec. 25, 1956 |
| 2,803,448 | Biebel | Aug. 20, 1957 |
| 3,024,986 | Strianese et al. | Mar. 13, 1962 |

OTHER REFERENCES

"The Vernier Time-Measuring Technique" by Robt. G. Baron, Proc. of IRE, January 1957, vol. 45, No. 1, pp. 21–29.

"Magnetic Vernier for Shaft Digitizer" by L. A. Knox, IBM Technical Disclosure Bulletin, October 1959, vol. 2, No. 3, pp. 18 and 19.